(12) United States Patent
Guigou et al.

(10) Patent No.: US 10,965,175 B2
(45) Date of Patent: Mar. 30, 2021

(54) ELECTRONICALLY SWITCHED ELECTRIC MOTOR AND CORRESPONDING AIR PULSE DEVICE

(71) Applicant: Valeo Systemes Thermiques, Le Mesnil Saint Denis (FR)

(72) Inventors: Pascal Guigou, Le Mesnil Saint-Denis (FR); Geoffroy Capoulun, Le Mesnil Saint-Denis (FR); Xavier Rousseil, Le Mesnil Saint-Denis (FR); Jonathan Fournier, Le Mesnil Saint-Denis (FR); Morgan Le Goff, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 545 days.

(21) Appl. No.: 15/575,849

(22) PCT Filed: May 23, 2016

(86) PCT No.: PCT/EP2016/061617
§ 371 (c)(1),
(2) Date: Nov. 21, 2017

(87) PCT Pub. No.: WO2016/193047
PCT Pub. Date: Dec. 8, 2016

(65) Prior Publication Data
US 2018/0159390 A1    Jun. 7, 2018

(30) Foreign Application Priority Data

May 29, 2015   (FR) ...................................... 1554873

(51) Int. Cl.
*H02K 11/22*   (2016.01)
*H02K 1/18*    (2006.01)
(Continued)

(52) U.S. Cl.
CPC ........... *H02K 1/187* (2013.01); *H02K 5/1735* (2013.01); *H02K 11/0141* (2020.08);
(Continued)

(58) Field of Classification Search
CPC ..................................................... H02K 11/022
See application file for complete search history.

(56) References Cited

U.S. PATENT DOCUMENTS

2015/0333596 A1* 11/2015 Berkouk ................ H02K 11/40
310/71

FOREIGN PATENT DOCUMENTS

DE   10 2013 001339 A1   7/2014
FR       2 679 076 A1    1/1993
(Continued)

OTHER PUBLICATIONS

International Search Report issued in PCT/EP2016/061617 dated Jul. 28, 2015 (3 pages).
(Continued)

*Primary Examiner* — Ramon M Barrera
(74) *Attorney, Agent, or Firm* — Osha Bergman Watanabe & Burton LLP

(57) ABSTRACT

An air pulse device according to the invention is used, in particular, in a heating, ventilation and/or air conditioning system of a motor vehicle. The air pulse device comprises an electric motor (2) having a rotor (16) and a stator (14). The stator is mounted about a support means (10) such that it is in contact with said support means, the latter being made of an electrically conductive material and connected to an electrical ground. Moreover, a shield (70) is disposed in the vicinity of the stator, said shield also being electrically connected to the electrical ground.

24 Claims, 4 Drawing Sheets

(51) Int. Cl.
*H02K 5/173* (2006.01)
*H02K 21/22* (2006.01)
*H02K 11/01* (2016.01)

(52) U.S. Cl.
CPC ........... *H02K 11/022* (2013.01); *H02K 21/22* (2013.01); *H02K 21/227* (2013.01); *H02K 2211/03* (2013.01)

(56) References Cited

FOREIGN PATENT DOCUMENTS

| | | |
|---|---|---|
| GB | 2 092 834 A | 8/1982 |
| WO | 2013/098309 A2 | 7/2013 |

OTHER PUBLICATIONS

Written Opinion of the International Searching Authority issued in PCT/EP2016/061617 dated Jul. 28, 2015 (8 pages).

\* cited by examiner

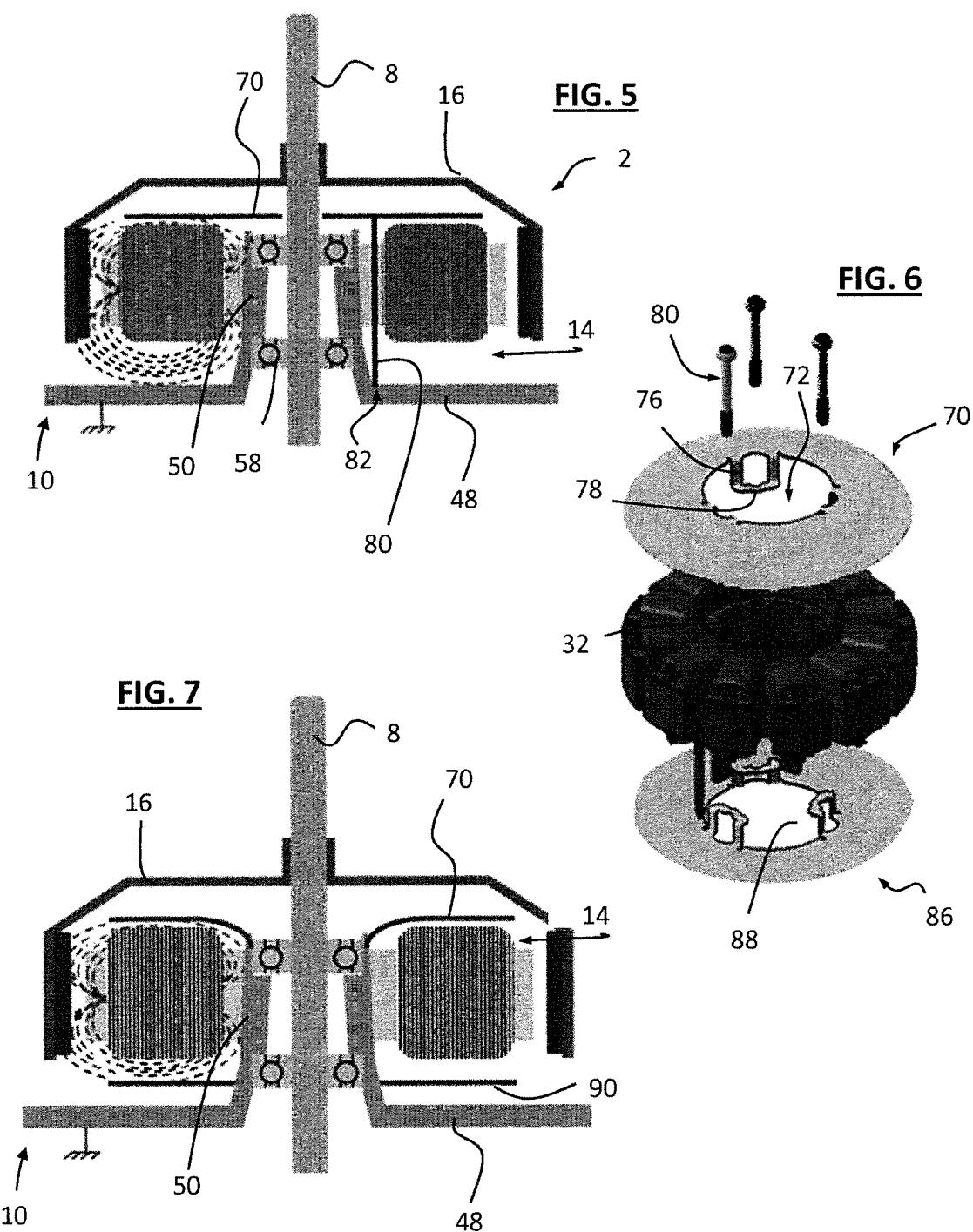

ELECTRONICALLY SWITCHED ELECTRIC MOTOR AND CORRESPONDING AIR PULSE DEVICE

The present invention relates to the field of electric motors, and in particular to that of electronically switched motors. More specifically, it relates to air pulsing devices in motor vehicles comprising such electric motors.

An air pulsing device equipped with an electric motor according to the invention is, for example, used in a ventilation, heating and/or air conditioning system of a motor vehicle.

The electronically switched electric motors, or brushless direct current motors, comprise a rotor and stator assembly, each of these components bearing electromagnetic elements whose interaction generates the movement of the rotor in relation to the stator. The rotor and the stator are mounted independently of one another in said motor, and it is important to ensure that the relative positioning of these two components is correct for optimal operation of the motor. These two components, in operation, generate electromagnetic radiation which may disrupt the operation of other electronic devices positioned in proximity.

The present invention falls within this context and its aim is to propose an electric motor and an associated air pulsing device which make it possible to limit the propagation of electromagnetic waves out of the air pulsing device.

An air pulsing device should be understood to be a device that makes it possible to suck and/or blow air.

The air pulsing device according to the invention is of the type comprising a fan wheel driven in rotation by an output shaft of an electronically switched electric motor, with the motor consisting of at least one rotor secured in rotation to the output shaft and suitable for rotating about a stator. The stator has an annular form with a central wall which delimits the outline of an internal bore through which said output shaft passes, and it also comprises a plurality of teeth arranged radially in star fashion from the external face of said central wall and each bearing a magnetic coil generating an electromagnetic field, said teeth having, at their distal end, opposite the central wall, metal plates which extend substantially parallel to the axis of the output shaft. In particular, provision can be made for each metal plate to be arranged such that an area of passage for the winding of the coil is formed between two neighboring metal plates. The rotor, arranged around the stator, bears at least one permanent magnet whose interaction with said current-powered coils generates a rotational movement of the rotor about the stator.

According to the invention, provision is made on the one hand for the stator, in particular the internal face of the central wall of said stator, to be in contact with a support means around which the stator is mounted, said support means being electrically conductive and electrically connected to an electrical ground, and provision is made on the other hand for at least one shield to be positioned in the vicinity of the stator, said shield being also connected electrically to the electrical ground.

This arrangement allows the formation of a conductive enclosure linked to the electrical ground, and therefore maintained at a fixed potential, so as to form a shielding capable of containing, within the air pulsing device, the electrical field created by the current switching in the coils of the stator generates electrical fields.

According to a first series of features, taken alone or in combination, specific to the electrical connection of the stator to the support means, provision will be able to be made for:

the internal face of the central wall defining said internal bore to have at least one rib which extends radially toward the interior of the bore;

this rib to have two lateral faces each prolonging said internal face of the central wall and a contact face suitable for being in contact with the support means;

the contact face to be incurved such that the curvature of the contact face is defined by a circle centered on the axis of the internal bore;

the at least one rib to be prolonged, substantially toward the axis of the internal bore, by a pin which extends protruding from the contact face;

the internal face of the central wall defining the central bore to comprise at least three ribs positioned according to a regular angular distribution;

the internal bore of the stator to have a tapered form, such that the bore has a greater diameter at its end turned toward the plate than at its end turned toward the rotor.

Advantageously, provision is made for the support means to be formed by a single piece comprising a sleeve and a plate, the sleeve, around which the stator is mounted, and in which said output shaft secured to the rotor is rotatably mounted, protruding out from the plate that is positioned transversely on one side of the stator, opposite the side of said rotor. The fact of having a single piece which serves as support means for the stator and for the rotor makes it possible to obtain a good coaxial alignment between the rotor and the stator, such that risks of malfunctioning of the motor such as alternating of speeding-up and slowing-down phases are thus limited.

It will be possible in this context to provide for the output shaft of said motor to be mounted to rotate inside the sleeve via rolling bearings. Also, the plate of the is support means will be able to form a heat sink bearing a control electronic circuit board, in particular for powering the coils of the stator, the control electronic circuit board then being positioned on the face of the plate oriented opposite the sleeve.

According to a second series of features, taken alone or in combination with one another and with the first series of features described above, provision will be able to be made for the shield to be positioned transversely to the output shaft, between the rotor and the stator.

the shield extends radially over all the diameter of the stator;

the shield has a substantially flat annular form, pierced at its center by a bore to be passed through by the motor output shaft;

the shield is fixed onto the stator, by at least one fixing screw capable of cooperating with a hole formed in the stator;

the internal bore of the stator has two distinct parts through modification of the internal diameter of the central wall delimiting said internal bore, a first part of larger diameter extending from the edge positioned axially in the vicinity of the shield to a shoulder edge delimiting a second part of smaller diameter, said hole cooperating with the fixing screw being formed in the shoulder edge;

the shield comprises at least one tab which prolongs, substantially at right angles, the edge delimiting the central bore of the shield, and whose free end has a bearing edge, such that the tab comes into contact with the shoulder edge by this bearing edge when the shield is in position covering the stator;

the bearing edge is arranged to allow the body of the fixing screw to pass into the fixing hole and be pressed against the shoulder edge by the screw head;

three fixing holes are evenly distributed at 120° over the perimeter of the internal bore of the stator;

the shield is connected to a substantially zero electrical potential via said at least one fixing screw which extends substantially parallel to the motor output shaft, by passing through said stator to engage on said support means;

the stator has at least one axial boss positioned protruding from the internal face of the central wall defining the internal bore of said stator, said boss being pierced axially by the fixing hole capable of being passed through by the at least one fixing screw;

the shield is produced in an electrically conductive material which can for example be aluminum.

It will also be possible to provide for the shield that was the subject of the second series of features given above to be a first shield forming part of a cover of the stator which also comprises a second shield, positioned covering the stator on the axial side of the stator opposite the side covered by the first shield, between said stator and the support means.

According to different variant embodiments, this second shield can extend transversely or parallel to the output shaft of the motor.

In the first case, with a second shield extending transversely, it would be possible to provide for the second shield to extend radially over all the diameter of the stator; the second shield will then also be able to have a substantially flat annular form, pierced at its center to be passed through by the motor output shaft. And the second shield will be able to be fixed onto the stator.

In the second case, with a second shield extending axially, it will be possible to provide for this second shield to extend substantially in the extension of the plates borne at the periphery of said stator. The second shield can then have an annular crown ring form, and be fixed onto the stator or directly onto the plate. Here again, it is advantageous for the second shield to be produced in an electrically conductive material, for example in aluminum.

The present invention relates also to a heating, ventilation and/or air conditioning system of a motor vehicle comprising at least one air pulsing device according to what has just been described previously.

Other features and advantages of the invention will become apparent from reading the following detailed description of an embodiment, and for the understanding of which reference will be made to the attached drawings in which:

FIG. 1 is a perspective exploded representation of an air pulsing device according to the invention;

FIG. 2 schematically illustrates an air pulsing device comprising, according to the invention, radial containment means for the electromagnetic radiations;

Figure 8:
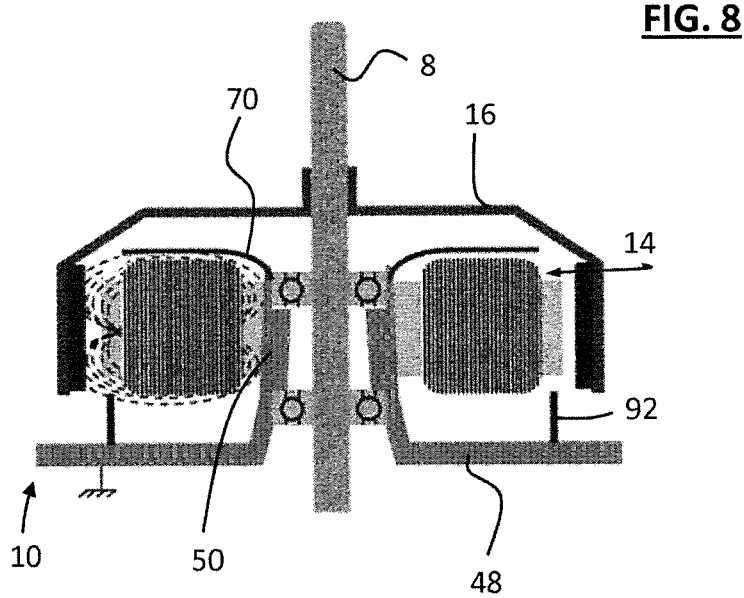
Figure 9:
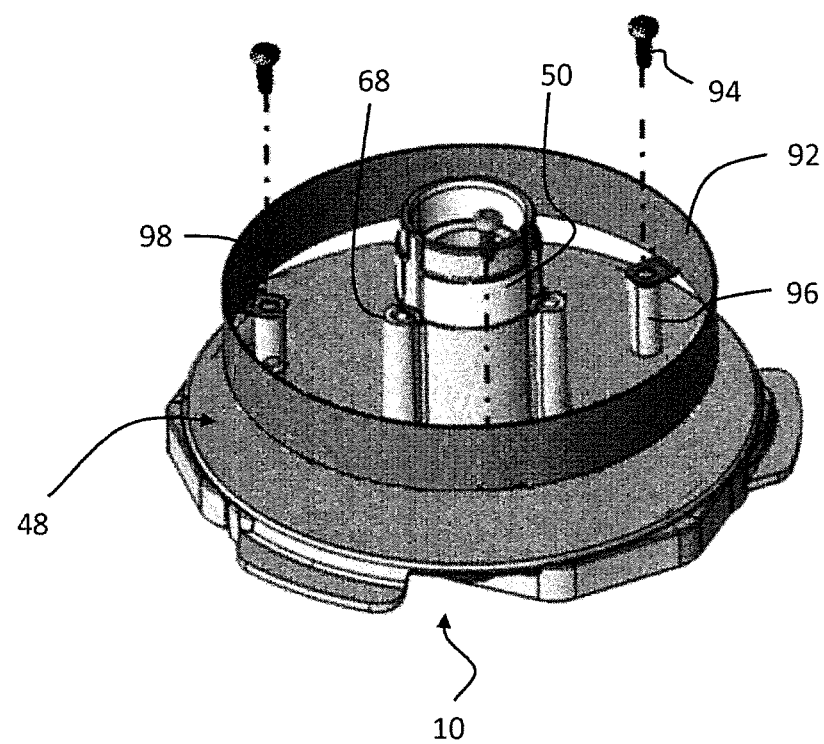

FIG. 5 schematically illustrates an air pulsing device comprising, according to the invention, radial containment means for the electromagnetic radiations and axial containment means, with a shield, for these same radiations according to a first embodiment;

FIG. 6 is a perspective view of a stator and of axial containment means with two shields, according to a first variant embodiment;

FIG. 7 schematically illustrates an air pulsing device comprising, according to the invention, radial containment means for the electromagnetic radiations and axial containment means, with two shields, for these same radiations according to a second variant embodiment;

FIG. 8 schematically illustrates an air pulsing device comprising, according to the invention, radial containment means for the electromagnetic radiations and axial containment means, with two shields, for these same radiations according to a third variant embodiment; and FIG. 9 is a perspective view of a detail of the device of FIG. 8.

An air pulsing device 1, which makes it possible to suck in and/or blow out air, comprises at least one electronically switched electric motor 2, capable of rotationally driving a fan wheel 4, of the type here with fins 6, via an output shaft 8 of the electric motor. The device also comprises at least one support means 10 incorporating several functions including the support of the electric motor 2, the cooling of the components of said device and the support of a control electronic circuit board 12 of said electric motor.

The electric motor mainly comprises an inducing stator 14 and an induced rotor 16, bearing the output shaft 8 capable of driving the fan wheel 4. The stator 14 is secured to the support means 10 of the motor, and the rotor 16 is arranged around the stator 14 to be driven in rotation under the effect of the magnetic fields generated by the winding and the magnets associated with the rotor and the stator.

Figure 3:
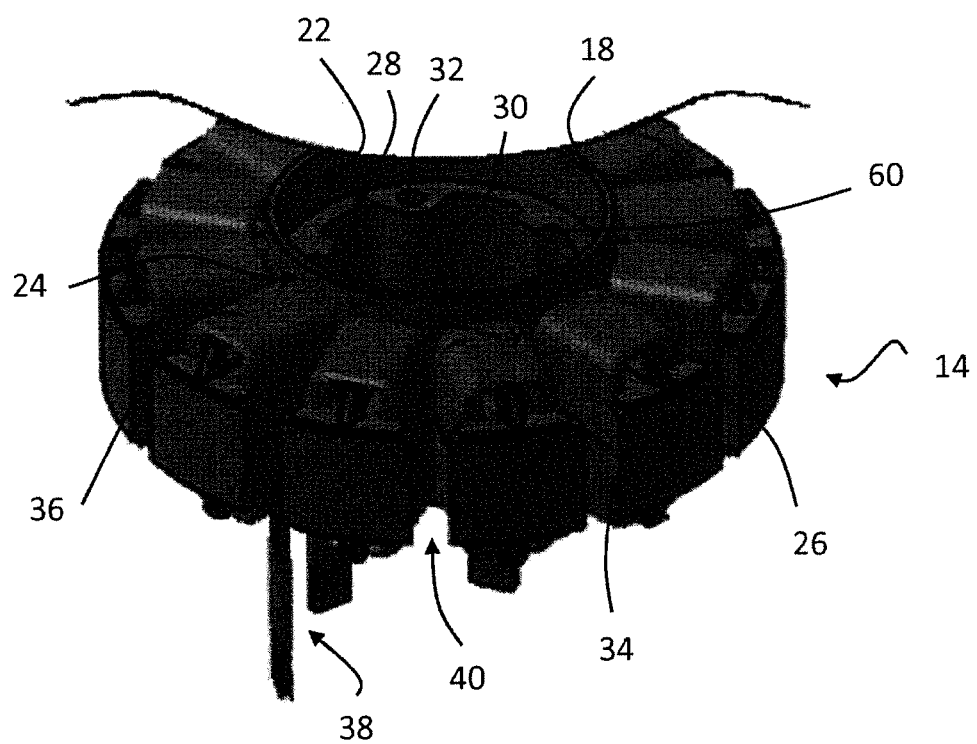
FIG. 3 is a perspective view of a stator with which an electric motor is equipped in an air pulsing device according to the invention.

As can be seen in FIG. 3, the stator 14 has an annular form with a central wall 18 which delimits the outline of an internal bore 20. The central wall has an internal face 22 turned toward the internal bore and an external face 24 prolonged by a plurality of teeth 26 arranged radially in star configuration.

The internal bore 20 of the stator has distinct parts through modification of the internal diameter of the central wall delimiting said internal bore, parts of larger diameter extending from the edges of axial ends of the central wall to a shoulder edge 28 delimiting a central part of the internal bore of smaller diameter. In this central part, the stator has at least one axial boss 30 positioned protruding from the internal face, said boss being pierced axially by a fixing hole 32 as described hereinbelow.

The teeth 26 are formed by a straight wall, of which a proximal radial end is secured to the central wall 18 of the stator 14 and of which a free distal radial end is prolonged by a plate 34 which extends over all the height of the stator and which is wider than the straight wall, in order to form an abutment wall for the winding made to be spooled around the straight wall of the teeth. Each plate is covered opposite the straight wall by a superpositioning of different layers of sheet steel, glued to one another.

The stator 14 comprises an excitation winding composed of several phases, each comprising at least one wire winding 36, the outputs of which are connected electrically to power supply means not represented here (only the connection means 38 being visible in FIG. 3).

In a particular embodiment, the stator comprises twelve teeth wound in three-phase configuration. The wire winding is produced around teeth, each tooth bearing a winding element. As illustrated in FIG. 3, the plates 34 borne at the end of the teeth and the metal layers which are glued thereto are dimensioned to provide a zone of passage 40 between them that can allow the space necessary to perform the winding of the wire around the teeth.

The rotor 16 is bell-shaped, with an annular crown ring 42 and a closure wall 44 positioned at an end of said crown ring.

The closure wall can have a flat form substantially at right angles to the axis of the crown ring or else an incurved form a clear distance from the crown ring, and it bears, at its center, the motor output shaft 8.

The crown ring 42 has a diameter greater than the external diameter of the stator, such that the rotor can cover the stator. The crown ring has an internal face which is turned toward the stator in this covering position, and at least one permanent magnet 46 is positioned on this internal face of the crown ring of the rotor.

When the motor is assembled, the stator 14 is positioned in the body of the rotor 16 delimited by the crown ring 42. The rotor and the stator are thus arranged for the permanent magnet 46 borne by the rotor 16 to be constantly positioned in the magnetic field generated by the coils of the stator 14 when the latter are supplied with current, so as to generate a rotational movement of the rotor about the stator.

Figure 1:
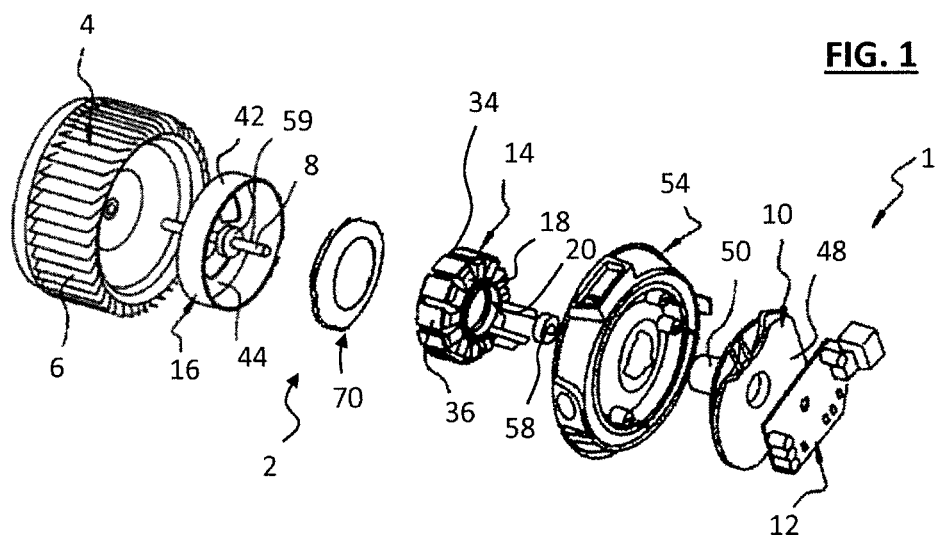
Figure 2:
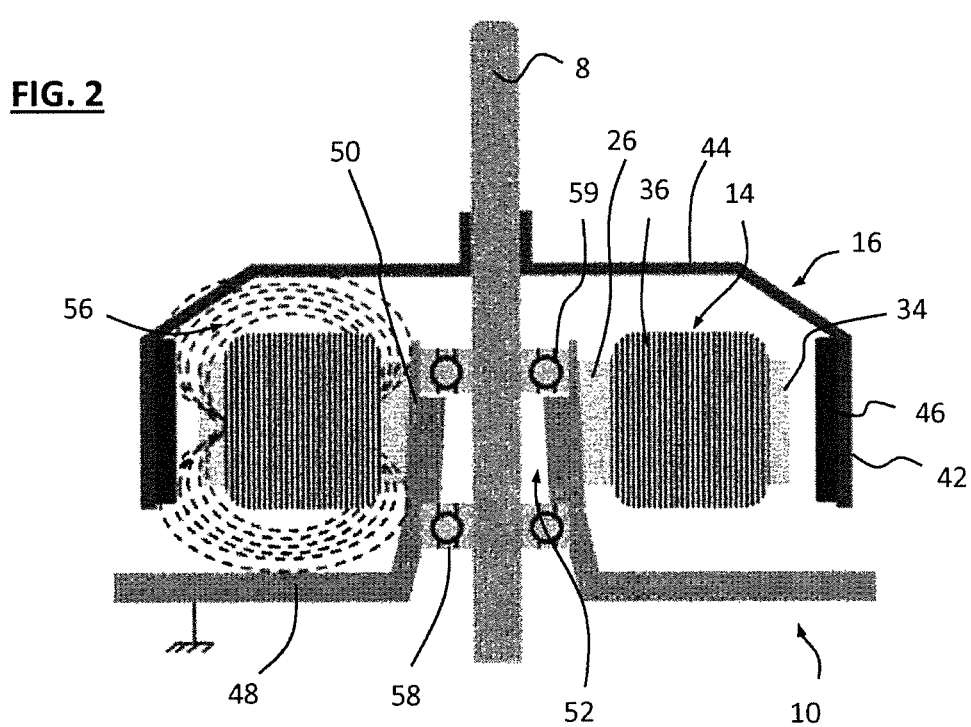

In the air pulsing device 1 comprising the electric motor 2 according to the invention, the stator 14 and the rotor 16 are arranged such that the closure wall 44 of the rotor is turned toward the fan wheel 4 and the rotor 14 is positioned facing the support means 10. The latter takes the form of a plate 48 and a sleeve 50 positioned protruding from the plate and having an internal channel 52 emerging substantially at the center of the plate, and it is fixed relative to the structure of the vehicle, here via a frame 54 illustrated in FIG. 1.

The plate 48 extends in a plane substantially at right angles to the axis of revolution of the internal channel of the sleeve 50. The sleeve, substantially cylindrical, is capable of being housed in the internal bore 20 of the stator 14 and of receiving the motor output shaft 8 secured to the rotor 16, so that it will be understood that this support means 10 ensures the correct positioning of the rotor 16 relative to the stator 14. it can be seen in FIGS. 1, 2, 6, 8 and, more clearly in FIG. 9, that the sleeve 50 and the plate 48 form a one-piece part, it being understood that the support means is one-piece in as much as the separation of the sleeve and of the plate results in a destruction of one or other of these components. In the figures, the plate 48 has a disk form but it will be understood that the latter can take other forms, for example rectangular, square, elliptical, etc.

The plate 48 of the support means forms a heat sink bearing a control electronic circuit board 12, in particular for powering the coils of the stator. The control electronic circuit board is positioned on the face of the plate 48 oriented away from the sleeve 50.

Preferentially, the support means 10 is made of metal. Thus, the plate 48 serving as heat sink can effectively cool the electronic member by thermal conduction. Furthermore, the fact that the support means is produced in metal makes it possible to block electromagnetic radiations emitted by the electronic member, these radiations being able to disrupt the operation of the electric motor. Furthermore, the fact that the support means is made of metal makes it possible to connect the stator 14 to the ground via the support means 10. In effect, the plate 48 of the support means 10 is fixed relative to the structure of the vehicle, here via the frame 54, such that the support means is considered to be electrically connected to the earth. Preferentially, the support means is made of aluminum, such that the characteristics of lightness and of good thermal conduction can be associated with this part.

As can be seen in particular in FIGS. 2, 5, 7 and 8, the stator 14 is fixed onto the support means 10 and the rotor 16 is arranged to rotate about the stator 14. In particular, the stator is positioned around the sleeve 50, but being in contact with the external face of the sleeve, while the rotor 16 is received, via the output shaft 8 to which it is secured, in the internal channel 52 of the sleeve. The electrical power supply of the coil wires creates magnetic fields 56, illustrated by way of example for a winding around a tooth in FIGS. 2 and 3, which forces the rotation of the rotor driven under the effect of the permanent magnet 46 that it bears. The result thereof is a driving of the output shaft 8 of the motor which, as illustrated, is borne by the rotor 16 and which is mounted to rotate inside the sleeve 50 of the support means via rolling bearings.

Two rolling bearings 58, 59 are inserted into the internal channel 52 of the sleeve 50 to serve as rotation guide for the output shaft 8 of the motor driven otherwise in rotation by the rotor 16. These rolling bearings can be ball bearings, as schematically illustrated, but it will be understood that they could take the form of roller, needle or other such bearings.

The fan wheel 4 of the air pulsing device 1 is secured to the free end of the output shaft 8 of the motor which extends opposite the stator 14 and the support means 10, and it comprises, positioned at its periphery, a plurality of fins 6. The rotation of the rotor rotationally drives the wheel which contributes to producing the pulsed air via the fins.

It is particularly noteworthy according to the invention that the electric motor 2 formed by the rotor 16 and the stator 14 also comprises containment means for avoiding the propagation of the electromagnetic radiations out of the motor and of the air pulsing device.

In particular, the motor comprises radial containment means, that is to say means making it possible to avoid the radial propagation of these electromagnetic radiations, at right angles to the axis of the output shaft of the motor.

The internal face 22 of the central wall 18 of said stator is in contact with the sleeve 50 arranged protruding from the plate 48, it being understood that the one-piece part formed by the sleeve 50 and the plate 48 is metallic and linked to a substantially zero electrical potential. The result thereof is that the metal layers positioned on the plates 34 on the perimeter of the stator 14 are brought to the zero potential and form, by the equivalent of a Faraday cage, the radial containment means.

In order for these radial containment means to be effective, it is important to ensure the correct electrical connection to the zero potential of the plates 34 and therefore to ensure the good contact between the stator 14 and the support means 10.

Figure 4:
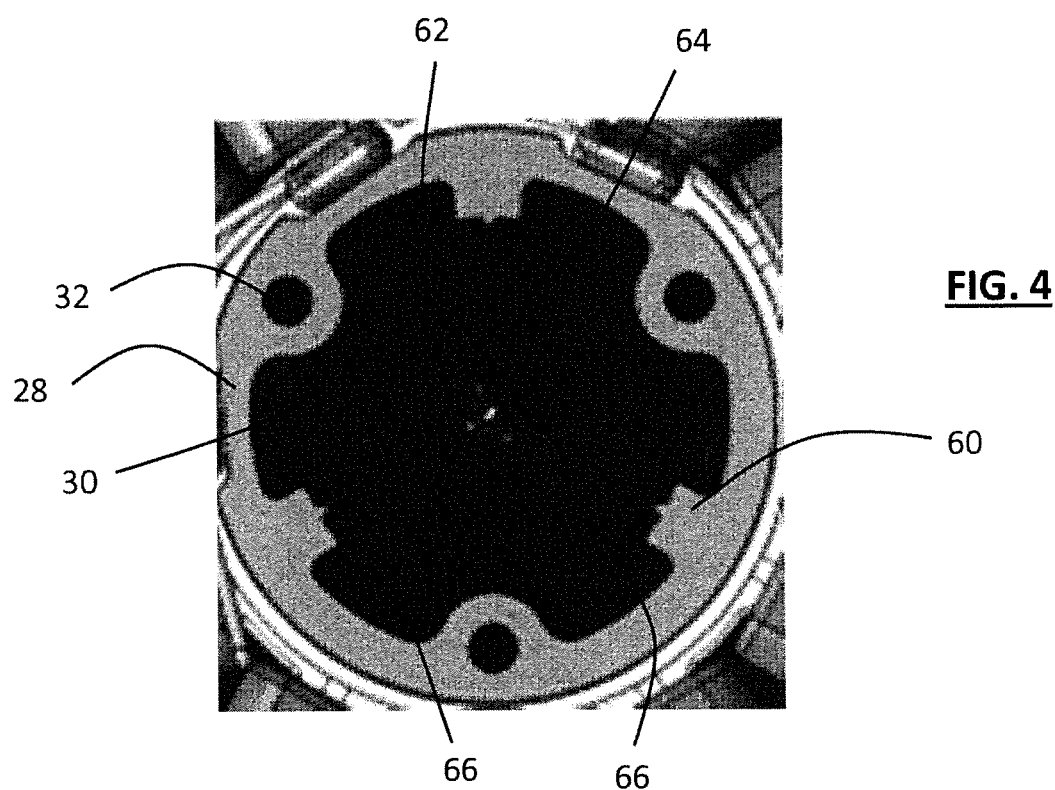
FIG. 4 is a partial top view of the stator of FIG. 3.

In FIGS. 3 and 4, means have been illustrated for ensuring this good contact, this being obtained in particular by the fact that the internal face 22 of the central wall 18 defining the internal bore 20 of the stator 14 has at least one rib 60 which extends radially toward the interior of this internal bore 20. This rib 60 has two lateral faces 62 each prolonging said internal face of the central wall 18 and a contact face 64 capable of being in contact with the sleeve of the support means. The contact face 64 is incurved such that the curvature of the contact face is defined by a circle centered on the axis of the internal bore 20. Provision can be made for the internal bore 20 of the stator to comprise three of these ribs 60, positioned according to a regular angular distribution, at 120° in this case. A seat of circular section is thus created to receive the cylindrical sleeve of the support means.

In order to even more effectively ensure the contact between the stator and the sleeve of the support means, provision can also be made to advantageously modify at least one rib 60, in particular to prolong it, substantially toward the axis of the internal bore, by a pin 66 which extends protruding from the contact face 64. Advantageously, as illustrated, this pin 66 can take the form of a spike that is sufficiently rigid not to break when the sleeve is fitted into the internal bore of the stator, and each of these ribs 60 can bear such a pin 66.

According to a variant that is not represented, it will be possible to provide for the internal bore 20 of the stator to have a tapered form, such that the bore has a greater diameter at its end turned toward the plate 48 than at its end turned toward the rotor, and for the external profile of the sleeve 50 of the support means onto which the stator 14 is fitted to also have a tapered form. In this way, a contact is assured over all the periphery of the sleeve when the stator is fitted onto the support means.

It will also be possible to provide for the sleeve 50 to have, axially, two distinct sections in as much as a first section, in the direct extension of the plate, to have an external diameter greater than the second section prolonging the first section to the free end of the sleeve. In this way, a shoulder is formed between the two sections and the stator can come to bear onto this shoulder when it is threaded around the sleeve. Such a shoulder 68 can be seen illustrated in FIG. 9 for example. Such an arrangement should be combined with the presence of the ribs 60, possibly equipped with pins 66 described previously, to ensure several zones of contact and thus ensure a good electrical connection between the support means and the stator.

There now follows a description of particular embodiments in that the containment means consist of the presence of at least one additional shield produced in a conductive material, notably in aluminum, and connected electrically to the ground. Provision can in particular be made to position such a shield on one side or the other of the stator 14, or on both sides.

In FIG. 5, the motor 2 comprises a first shield 70, positioned transversely to the output shaft 8, between the stator 14 and the rotor 16, to form axial containment means for the electromagnetic radiations. In order to form an effective containment means, the first shield 70 extends transversely over all the diameter of the stator.

As illustrated in FIG. 6, provision can be made for the first shield 70 to have a substantially flat annular form, pierced at its center by a bore 72 to be passed through by the output shaft 8 of the motor which extends between the rotor 16 and the stator 14.

The first shield 70 is fixed onto the stator 14 substantially at the center of the shield. And the fixing means provided, based on screwing, also allow this first shield 70 to be connected to the ground. To this end, the first shield 70 comprises at least one tab 76 which prolongs, substantially at right angles, the edge delimiting the central bore 72 of the first shield. The free end of this tab has a bearing edge 78 folded back at right angles to the rest of the tab, to come into contact with the stator and more particularly with the shoulder edge 28 of the internal bore 20 of the stator 14, when the first shield 70 is in position covering this stator 14. The first shield is arranged angularly for the bearing edge 78 of this tab to be arranged around a fixing hole 32 produced in the thickness of the stator.

The bearing edge 78 is arranged to allow passage for the body of a fixing screw 80, which extends substantially parallel to the motor output shaft, for the insertion of this screw into the corresponding fixing hole 32, and to be pressed against the shoulder edge 28 by the screw head.

As illustrated, the first shield 70 comprises three fixing tabs 76, evenly distributed at 120° over the perimeter of the central bore of the shield, and as many fixing holes 32 are provided for the first shield to be pressed against the stator by three fixing screws 80.

Advantageously, provision is made to use the fixing screws 80 for the electrical grounding of the first shield 70, this grounding being necessary for the first shield to be able to limit the propagation of the electromagnetic radiations.

The first shield 70 is grounded via at least one of the fixing screws 80, which to this end passes through the stator 14 to engage on the other side of the stator, on the plate 48. As illustrated in FIG. 5, this fixing screw 80 passes through a smooth fixing hole produced through the stator 14 and it engages in a tapped hole 82 produced in the plate. It will be understood that each of the three fixing screws can have such an arrangement, or else that only one of the fixing screws 80 passes through the stator 14 to engage on the plate 48, the other two fixing screws being shorter so as to cooperate with a tapped fixing hole 32 in the body of the stator. The electrical connection of the shield and its grounding is done via the metal plate 48, the at least one metal fixing screw 80 engaged in the plate, and the contact between the tab 76 of the shield and the screw head.

There now follows a description, particularly with reference to FIGS. 6 to 8, of a particular embodiment in as much as two shields are provided to form a more effective coverage of the stator. A first shield 70 is positioned covering the stator 14 as specified previously, between the rotor 16 and the stator 14, and a second shield is positioned on the axial side of the stator 14 opposite the side covered by said first shield 70, that is to say between said stator 14 and the plate 48. This second shield is also produced in an electrically conductive material, for example in aluminum, like the first shield.

Because of the presence of the plate, this second shield can have several variants. In a first variant, illustrated in FIG. 6, the second shield 86 extends transversely to the axis of the motor output shaft and it has a form similar to that of the first shield described previously, by being symmetrical to it in relation to the stator. In this way, the second shield extends radially over all the diameter of the stator, and it has a substantially flat annular form, pierced at its center to be passed through by the sleeve of the support means. The second shield comprises, like the first shield, fixing tabs 88 to be screwed onto the stator. At least one of the fixing screws 80 described previously is threaded over a height that is sufficiently great to cooperate with a tapped hole in the plate and be engaged with a nut not represented here which presses the second shield 86 onto the stator. The first shield 70 and the second shield 86 are thus grounded, at the same substantially zero electrical potential, and an optimal axial containment of the electromagnetic radiations is assured.

In a second variant, illustrated in FIG. 7, the second shield 90 is, as has just been described, transverse to the axis of the motor output shaft 8, and it extends radially over all the diameter of the stator 14, having a substantially flat annular form. However, the second shield is substantially different from the first shield in that it is fitted in its central bore onto the sleeve 50 of the support means 10. The grounding of the second shield 90 is done by contact with the sleeve 50 secured to the plate 48 which is itself connected to the earth. It will be understood that such a variant embodiment is made possible only if the sleeve 50 and the plate 48 of the support means 10 form one and the same part connected to the earth. In this context, where the stator is fitted onto a sleeve connected to the zero electrical potential, it can be seen that FIGS. 7 and 8 show a first shield secured to the stator and therefore grounded without the need to have a means passing through to be engaged on the plate.

In a third variant, illustrated in FIGS. 8 and 9, the second shield 92 can extend axially, substantially in the extension of the plates 34 borne at the periphery of said stator 14, the second shield 92 then having an annular crown ring form. In this case, it is possible to fix the second shield either onto the stator 14, or onto the plate 48, this latter case being illustrated. The fixing of the second shield 92 is then done by second fixing screws 94 which cooperate with corresponding tapped bores in secondary sleeves 96 arranged protruding from the plate 48 around the sleeve 50. Fixing tabs 98, prolonging the crown ring at right angles, ensure the fixing of the second screen and the grounding.

The above description aims to explain how the invention makes it possible to achieve the objectives set for it and particularly propose an air pulsing device which contains the electromagnetic radiations, by the creation of containment means that are simple to manufacture, simple to mount and particularly effective. It is particularly noteworthy that a containment is made possible in all the directions, with both radial containment and axial containment, this axial containment being produced between the stator and the rotor, and between the stator and the plate.

However, the invention is not limited to only the air pulsing devices conforming to the embodiments explicitly described in light of FIGS. 1 to 9. As an example, it will be possible, without departing from the scope of the invention, to modify the form of the shield since it forms a good part of a box section tightly closing at least one side of the stator. It will also be understood that, in a variant embodiment, the means for fixing the shield onto the stator or onto the plate could have a different form, in particular by being distinct from the shield grounding means.

The invention claimed is:

1. An air pulsing device comprising an electronically switched electric motor, said motor comprising:
   a rotor; and
   a stator which is in contact with a support means of the stator,
   said support means being an electrical conductor linked to an electrical ground,
   wherein a shield is positioned in the vicinity of the stator, said shield being also connected electrically to the electrical ground,
   wherein said stator comprises an annular form with a central wall which delimits an internal bore through which passes a motor output shaft, and
   wherein an internal face of the central wall defining said internal bore has at least one rib which extends radially toward the interior of the bore.

2. The air pulsing device as claimed in claim 1, wherein said at least one rib has two lateral faces each prolonging said internal face of the central wall and a contact face suitable for being in contact with the support means.

3. The air pulsing device as claimed in claim 2, wherein said contact face is incurved such that the curvature of the contact face is defined by a circle centered on the axis of the internal bore.

4. The air pulsing device as claimed in claim 1, wherein the at least one rib is prolonged, substantially toward the axis of the internal bore, by a pin.

5. The air pulsing device as claimed in claim 4, wherein the pin extends protruding from the contact face.

6. The air pulsing device as claimed in claim 1, wherein said internal face of the central wall defining the internal bore bears at least three ribs positioned according to a regular angular distribution.

7. The air pulsing device as claimed in claim 1, wherein said support means is formed by a single piece comprising a sleeve, around which the stator is mounted, and a plate positioned transversely on one side of the stator opposite the side of said rotor and protruding from which extends said sleeve.

8. The air pulsing device as claimed in claim 7, wherein the output shaft of said motor is mounted to rotate inside the sleeve via rolling bearings.

9. The air pulsing device as claimed in claim 7, wherein the plate of the support means forms a heat sink bearing a control electronic circuit board for powering the coils of the stator.

10. The air pulsing device as claimed in claim 9, wherein the control electronic circuit board is positioned on the face of the plate oriented opposite the sleeve.

11. The air pulsing device as claimed in claim 1, wherein said shield is positioned transversely to the output shaft, between the rotor and the stator.

12. The air pulsing device as claimed in claim 11, wherein said shield extends radially over all the diameter of the stator.

13. The air pulsing device as claimed in claim 11, wherein said shield has a substantially flat annular form, pierced at its center by a bore to be passed through by the output shaft of the motor.

14. The air pulsing device as claimed in claim 13, wherein said shield is fixed onto the stator, by at least one fixing screw capable of cooperating with a hole formed in the stator.

15. The air pulsing device as claimed in claim 14, wherein the internal bore of the stator has two distinct parts through modification of the internal diameter of the central wall delimiting said internal bore, a first part of larger diameter extending from the edge positioned axially in the vicinity of the shield to a shoulder edge delimiting a second part of smaller diameter, said hole cooperating with the fixing screw being formed in the shoulder edge.

16. The air pulsing device as claimed in claim 15, wherein the shield comprises at least one tab which prolongs, substantially at right angles, the edge delimiting the central bore of the shield, and whose free end has a bearing edge, such that the tab comes into contact with the shoulder edge by this bearing edge when the shield is in position covering the stator.

17. The air pulsing device as claimed in claim 16, wherein the bearing edge is arranged to allow the body of the fixing screw to pass into the fixing hole and be pressed against the shoulder edge by the screw head.

18. The air pulsing device as claimed in claim 14, wherein three fixing holes are evenly distributed at 120° over the perimeter of the internal bore of the stator.

19. The air pulsing device as claimed in claim 14, wherein the shield is connected to the electrical ground via said at least one fixing screw which extends substantially parallel to the output shaft of the motor, by passing through said stator to engage on said support means.

20. The air pulsing device as claimed in claim 14, wherein the stator has at least one axial boss positioned protruding from the internal face of the central wall defining the internal bore of said stator, said boss being pierced axially by the fixing hole capable of being passed through by the at least one fixing screw.

21. The air pulsing device as claimed in claim 1, wherein the shield is produced in an electrically conductive material.

22. An air pulsing device comprising an electronically switched electric motor, said motor comprising:
- a rotor; and
- a stator which is in contact with a support means of the stator,
- said support means being an electrical conductor linked to an electrical ground,
- wherein a shield is positioned in the vicinity of the stator, said shield being also connected electrically to the electrical ground,
- wherein said stator has an annular form with a central wall which delimits an internal bore through which passes a motor output shaft, and
- wherein said stator further comprises a plurality of teeth arranged radially in star fashion from the external face of said central wall and each bearing a magnetic coil generating an electromagnetic field, said teeth having, at their distal end, opposite the central wall, metal plates which extend substantially parallel to the axis of the output shaft.

23. The air pulsing device as claimed in claim 22, wherein the rotor, arranged around the stator, bears at least one permanent magnet whose interaction with said current-powered coils generates a rotational movement of the rotor about the stator.

24. A heating, ventilation and/or air conditioning system of a motor vehicle, the heating, ventilation and/or air conditioning system comprising:
- at least one air pulsing device, the at least one air pulsing device comprising an electronically switched electric motor, said motor comprising:
  - a rotor; and
  - a stator which is in contact with a support means of the stator,
  - said support means being an electrical conductor linked to an electrical ground,
  - wherein a shield is positioned in the vicinity of the stator, said shield being also connected electrically to the electrical ground,
  - wherein said stator has an annular form with a central wall which delimits an internal bore through which passes a motor output shaft, and
  - wherein said shield is positioned transversely to the output shaft, between the rotor and the stator.

* * * * *